Nov. 23, 1948.    C. DE GANAHL    2,454,310
HEAT EXCHANGER AND REACTION THRUST APPARATUS
Filed May 24, 1944
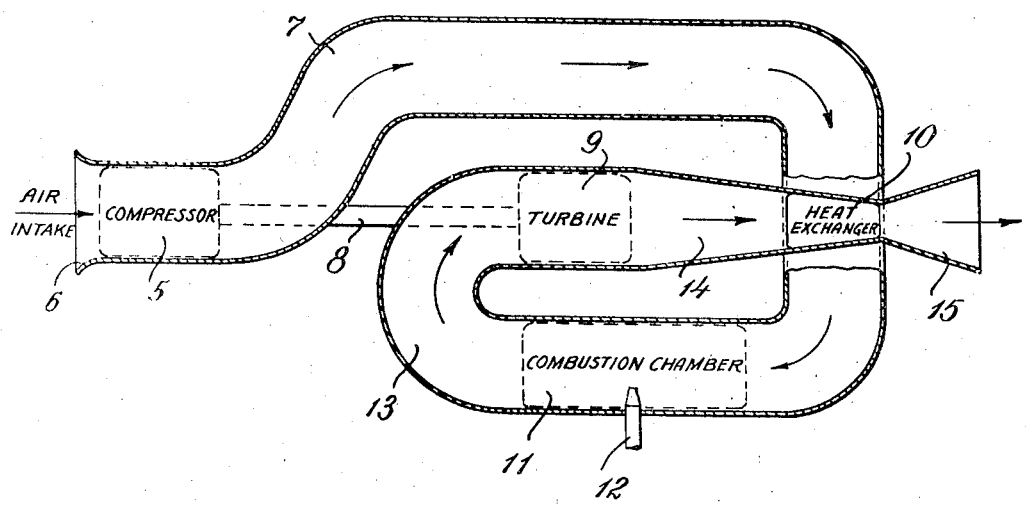
INVENTOR
Carl de Ganahl
BY
ATTORNEYS Patented Nov. 23, 1948

2,454,310

UNITED STATES PATENT OFFICE 2,454,310

HEAT EXCHANGER AND REACTION THRUST APPARATUS

Carl de Ganahl, Trenton, N. J., assignor to Kaiser Fleetwings, Inc., a corporation of California Application May 24, 1944, Serial No. 537,140

3 Claims. (Cl. 60—35.6)

This invention relates to so-called "jet propulsion," i. e., the utilization of the reaction momentum thrust of a jet of gas, and is particularly applicable in driving aircraft, although it may be utilized for other purposes.

In the development of jet propelled aircraft, fuel has been mixed with and burned in air which is compressed by power developed by passage of the combustion products through a gas turbine. The combustion products heretofore have been delivered to the atmosphere in the form of a jet or jets under conditions designed to utilize the reaction momentum thrust thereof to propel the aircraft. There have been certain definite limits of efficiency and of the maximum reaction momentum thrust obtainable by the system as heretofore known, and hence of the possible performance of aircraft equipped with such systems.

It is the object of the present invention to provide a method of increasing the efficiency and momentum reaction thrust of a jet of gas.

Another object of the invention is the provision of a method whereby the velocity of the gas forming the jet which is discharged at approximately atmospheric pressure is greatly increased, thereby affording the maximum possible power utilization in jet propulsion.

Another object of the invention is the refrigeration of the gas forming the jet by the transfer of heat therefrom to the compressed air in which the fuel is burned, increasing thereby the velocity of the jet and decreasing the amount of fuel required to maintain it.

Other objects and advantages of the invention will be apparent as it is better understood by reference to the following specification and the accompanying drawing, which is a diagrammatic illustration of an apparatus suitable for the practice of the invention.

When a jet of highly heated gas discharged from a gas turbine under pressure above atmospheric is directed through a passage, converging to the local velocity of sound and diverging beyond such velocity, the gas can be expanded to a pressure somewhat below atmospheric pressure with an accompanying increase in velocity to substantially the local velocity of sound or greater. If then the gas is refrigerated, i. e., heat is withdrawn therefrom in a heat exchanger, the pressure can be held below atmospheric pressure during refrigeration while the velocity is substantially maintained. The gas is brought back to atmospheric pressure in a diffuser so that it can be discharged at that pressure. Because the temperature of the gas at low pressure has been greatly reduced in the heat exchanger, the amount of velocity lost in the recompression is not so great as the amount of velocity gained in the expansion prior to refrigeration. Hence there is a net gain in velocity of the gas as it is discharged at atmospheric pressure and a greater reaction momentum thrust of the jet.

In applying this discovery to practical use, air is compressed with power derived from a turbine driven by the combustion products of fuel burned in the compressed air. The gas leaving the turbine is expanded in a passage, converging up to the local velocity of sound and diverging beyond that velocity to a pressure below atmospheric pressure while the velocity of the gas increases to approximately the local velocity of sound or greater. The gas is then refrigerated by heat exchange with the compressed air while the gas travels through the heat exchanger. During such travel, the pressure of the gas is maintained below atmospheric pressure and the velocity is still approximately that of the local velocity of sound or greater. The cooled gas is then compressed in a diffuser to atmospheric pressure and discharged at high velocity to afford the maximum obtainable reaction thrust which is materially increased by the refrigeration for the reasons noted. The diffuser will be converging if the velocity of the gas is above the local velocity of sound as it leaves the exchanger. If the velocity of the gas is at or below the local velocity of sound, the diffuser will be diverging. The heat exchanger acts in the system to improve the efficiency of the operation.

Referring to the drawing for a more specific disclosure of the principles of the invention, a rotary compressor 5 of any suitable construction is connected to an intake 6 which may be subject to static or impact pressure of the atmosphere through which the aircraft is traveling. Preferably the intake will be at the forward end of the aircraft so that impact pressure will be available when the aircraft is flying. The compressor 5 discharges air under pressure into a passage 7 and is driven by a shaft 8 which is connected to a gas turbine 9 of any suitable construction.

The passage 7 delivers the air under pressure to a refrigerator or heat exchanger 10 and thence to a combustion chamber 11. Fuel is introduced through a pipe 12 and burned in the air to provide a large volume of combustion products at high temperature. The temperature attainable is limited only by the materials available for construction, which of course must be protected. The combustion products pass through a passage 12 to and through the gas turbine 9, where sufficient energy in the gas is utilized to operate the compressor 5.

From the turbine 9, the combustion products enter a passage 14, converging up to the local velocity of sound and diverging above that velocity, and are expanded therein to a pressure somewhat below atmospheric pressure while the velocity of the gas increases to approximately the local velocity of sound or greater. It then enters the refrigerator or heat exchanger 10, which as shown has a converging passage. Here the gas gives up heat to the stream of high pressure air and the latter is heated prior to entering the combustion chamber 11 while the gas is cooled without substantial increase in pressure or loss of velocity. The cooled gas is discharged through a diffuser 15 in which its pressure is increased to atmospheric pressure with some loss of velocity but a net gain over that which would obtain if the refrigerator were not employed in the manner described.

Because the removal of heat by the refrigerator or heat exchanger reduces the work necessary to compress the gas back to atmospheric pressure after reduction of pressure by expansion to a pressure below atmospheric and the attainment of velocity substantially equal to the local velocity of sound or greater, there is an increment of velocity representing a net gain in the available reaction momentum thrust. Consequently there is a net gain in efficiency. This permits the consumption of less fuel to attain a given reaction momentum thrust and affords a substantial economy. Moreover, in equipment of given dimensions it is possible to drive an aircraft higher and faster than has been possible with jet propulsion heretofore.

The pressure to which the air is initially compressed and the temperature attained by the combustion products are not critical. Wide variation is possible with respect to the pressure, and the temperature in general will be as high as is compatible with security of the apparatus employed. An excess of air is always present and the temperature is determined by the amount of fuel burned therein.

The details of compressors, gas turbines and combustion chambers suitable for use in the present invention are well known in the art and require no further description. The invention herein depends upon the incorporation in combination with such devices of a refrigerator or heat exchanger for the transfer of heat from the gas delivered by the turbine and expanded to a pressure below atmospheric pressure and a velocity approximately that of the local velocity of sound or greater.

Various changes may be effected within the scope of the appended claims without departing from the invention or sacrificing the advantages thereof.

I claim:

1. In an apparatus of the character described, an air compressor, a gas turbine, a driving connection between the compressor and turbine, a combustion chamber, a conduit for compressed air between the compressor and the combustion chamber, means for supplying fuel to the combustion chamber, a conduit for combustion products between the combustion chamber and turbine, a converging passage connected to the discharge of the turbine, a heat exchanger affording heat transfer between compressed air in the conduit therefor and the combustion products leaving the converging passage and a diverging discharge passage for the combustion products connected to the heat exchanger.

2. In an apparatus of the character described, an air compressor, a gas turbine, a driving connection between the compressor and turbine, a combustion chamber, a conduit for compressed air between the compressor and the combustion chamber, means for supplying fuel to the combustion chamber, a conduit for combustion products between the combustion chamber and turbine, a converging passage connected to the discharge of the turbine, a heat exchanger having a converging passage for the combustion products affording heat transfer between compressed air in the conduit therefor and the combustion products leaving the converging passage and a diverging discharge passage for the combustion products connected to the heat exchanger.

3. In an apparatus of the character described, an air compressor, a gas turbine, a driving connection between the compressor and turbine, a combustion chamber, a conduit for compressed air between the compressor and the combustion chamber, means for supplying fuel to the combustion chamber, a conduit for combustion products between the combustion chamber and turbine, a converging passage connected to the discharge of the turbine, a heat exchanger affording heat transfer between compressed air in the conduit therefor and the combustion products and a diverging discharge passage for the combustion products connected to the heat exchanger.

CARL DE GANAHL.

REFERENCES CITED

The following references are of record in the file of this patent:

UNITED STATES PATENTS

| Number | Name | Date |
|---|---|---|
| 868,397 | Bergmans | Oct. 15, 1907 |
| 2,162,956 | Lysholm | June 20, 1939 |

FOREIGN PATENTS

| Number | Country | Date |
|---|---|---|
| 608,242 | Germany | Jan. 21, 1935 |
| 669,687 | Germany | Jan. 2, 1939 |